United States Patent
Mkervali

(10) Patent No.: US 12,113,637 B2
(45) Date of Patent: Oct. 8, 2024

(54) SYSTEM AND METHOD OF CONDUCTING A MENTAL CONFRONTATION IN A FORM OF A MOBILE APPLICATION OR A COMPUTER PROGRAM

(71) Applicant: David Petrosian Mkervali, Wilmington, DE (US)

(72) Inventor: David Petrosian Mkervali, Wilmington, DE (US)

( * ) Notice: Subject to any disclaimer, the term of this patent is extended or adjusted under 35 U.S.C. 154(b) by 36 days.

(21) Appl. No.: 17/581,866

(22) Filed: Jan. 22, 2022

(65) Prior Publication Data

US 2023/0097459 A1 Mar. 30, 2023

Related U.S. Application Data

(60) Provisional application No. 63/233,208, filed on Aug. 14, 2021.

(51) Int. Cl.
*H04L 12/18* (2006.01)
*G06V 20/40* (2022.01)
*H04L 51/52* (2022.01)

(52) U.S. Cl.
CPC .......... *H04L 12/1831* (2013.01); *G06V 20/46* (2022.01); *H04L 12/1822* (2013.01); *H04L 51/52* (2022.05)

(58) Field of Classification Search
CPC . H04L 12/1831; H04L 12/1822; H04L 51/52; G06V 20/46
USPC ........................................................ 709/204
See application file for complete search history.

(56) References Cited

U.S. PATENT DOCUMENTS

| | | | | |
|---|---|---|---|---|
| 7,305,436 B2 * | 12/2007 | Willis | .................. | G06F 16/954 709/219 |
| 8,914,452 B2 * | 12/2014 | Boston | .................. | G06Q 10/10 709/206 |
| 9,160,692 B2 * | 10/2015 | Socolof | ................. | G06F 3/0484 |
| 9,674,244 B2 * | 6/2017 | Katzman | .................. | H04N 7/15 |
| 9,707,474 B1 * | 7/2017 | Cardinale | ............... | A63F 13/35 |
| 2008/0183829 A1 * | 7/2008 | Smilowitz | ............ | G06Q 10/109 709/206 |
| 2013/0232203 A1 * | 9/2013 | Moeinifar | ............. | H04L 65/612 709/205 |
| 2014/0089960 A1 * | 3/2014 | Farah | ..................... | H04H 60/33 725/24 |
| 2014/0344039 A1 * | 11/2014 | Kowalczyk | ........ | G06Q 30/0217 705/14.19 |
| 2014/0344359 A1 * | 11/2014 | Broz | ..................... | G06Q 50/01 709/204 |
| 2017/0155608 A1 * | 6/2017 | Garen | ..................... | H04L 51/52 |
| 2018/0357220 A1 * | 12/2018 | Galitsky | ................. | G06F 40/30 |
| 2021/0258536 A1 * | 8/2021 | Mickeal | ................. | G06Q 50/01 |
| 2021/0319408 A1 * | 10/2021 | Jorasch | ............. | G06Q 10/1095 |
| 2021/0345002 A1 * | 11/2021 | Underwood | ....... | H04N 21/2187 |

FOREIGN PATENT DOCUMENTS

CA 2769994 A1 * 9/2012 ........... H04L 65/403

OTHER PUBLICATIONS

Unknown, "Judging Criteria," Mar. 2021, debate-nb.ca, https://web.archive.org/web/20210303213450/https://debate-nb.ca/for-judges/during-the-debate/judging-criteria/ (Year: 2021).*
Unknown, "Debate Grading Rubric," Jul. 2020, csun.edu, https://web.archive.org/web/20200702054239/https://www.csun.edu/~ds56723/phil338/hout338rubric.htm (Year: 2020).*

* cited by examiner

*Primary Examiner* — Ruolei Zong

(57) ABSTRACT

Systems and methods are disclosed herein for computer-aided method for developing, customizing, and facilitating the process of dispute, debates and discussions between individuals and groups. The mobile application, computer software, addons to instant messaging and online conference platforms create mental confrontation routines (e.g., dispute, debate or discussion), where opposing sides can formulate their position and support it with arguments or counter-arguments. All arguments and counter-arguments take the form of time-limited video clips, thus creating a personal component, showing the emotional state of parties, body language, facial expression-all that creates a feeling of realistic argument, yet in a structured step-by-step format. The weight of each side's arguments is assessed by judges (one or more) who choose the winner and administer justice.

4 Claims, No Drawings

SYSTEM AND METHOD OF CONDUCTING A MENTAL CONFRONTATION IN A FORM OF A MOBILE APPLICATION OR A COMPUTER PROGRAM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever

CROSS-REFERENCE TO RELATED APPLICATIONS

The present application relates to U.S. patent application Ser. No. 63/233,208, filed Oct. 10, 2012 and entitled "EXOSKELETON FOR MOBILE DEVICES," and published Aug. 13, 2021 the disclosures of which applications are hereby incorporated herein by reference.

BACKGROUND

Field of the Invention

The present invention relates generally to the field of Agonal communicative process aimed at establishing the truth and more specifically a method of conducting a mental confrontation in a form of a mobile application or a computer program.

Description of the Related Art

Social networks have become the new place to express our thoughts and ideas, share our opinions, and defend our viewpoints. "Social media" or "Social networks" refers to a computer-based technology that allows participants to communicate in an automated social environment, keeping users in touch with their friends, family, and acquaintances, even if they are far away. Users gain access to social networks via a computer, tablet, smartphone, or website.

Participants of social networks can create new connections with like-minded people who have the same views or values. The development of social networks provides instant access to users of similar mindsets, enabling us to form partnerships with more people in more ways than ever before.

At the same time, people can also reach users with different views who oppose their position through various communication channels inside the network.

By design, social media give users a quick way to communicate with each other. As a result, they express their opinions on different topics among their virtual networks that can support or oppose formulated positions, thus frequently creating low-quality mental conflict in the form of dispute, debate, or discussion.

In addition to social media, people are increasingly using "Web conferencing" or "virtual conferencing" as communication tool. "Web conferencing" or "virtual conferencing" refers to various forms of online collaborative services including web seminars, webcasts, and peer-level web meetings. Web conferencing systems today support real-time audio and video streaming between participants, typically under the coordination of a central web conferencing server.

Applications for web conferencing include online classrooms, meetings, training sessions, lectures, and seminars, to name a few.

Discussion between web conference participants can facilitate interactions among web conference users and be used for teaching, training, business meetings, or other purposes. However, during such sessions, conflict situations frequently occur between participants with opposite views. In most cases, such conflicts are either postponed, unsolved or solved unfairly.

Online disputes and debates carried out on Internet, in most cases, end in vain due to the lack of a visible structure, clear boundaries, and a method that solves conflicts fast, easy and fairly.

A method, that includes: a) clear boundaries and limits, b) a mechanism for their implementation, c) a procedure to appoint a third party (e.g., the judge), capable of solving confrontation, d) criteria to appoint the winner, e) restrictions that focus users' attention on the quality of argumentation, and f) limit their ability to break the rules. One of the major issues is, in particular, blocking the possibility of interrupting each other or exceeding the devoted time for argumentation.

Mental confrontations (e.g., debates, disputes, and discussions) hosted offline (e.g., TV debates) and streamed online via a video stream require extensive infrastructure for each dispute or debate and are expensive to scale.

Currently, there is a need for the method in the field of online conflictology to help solving online disputes and debates fast, easy, and efficient through formalized communication aimed at finding and establishing the truth.

Looking at the prior art there are no advancements that have been seen in similar regards which are not only convenient to masses but also rewarding for them for their contribution toward society and environment. Therefore, it would be advantageous to have an improved method, apparatus, and computer instructions for providing user an online platform where a method of conducting a mental confrontation in a form of a mobile application or a computer program is implemented.

None of the previous inventions and patents, taken either singly or in combination, is seen to describe the instant invention as claimed. Hence, the inventor of the present invention proposes to resolve and surmount existent technical difficulties to eliminate the aforementioned shortcomings of prior art.

SUMMARY

In light of the disadvantages of the prior art, the following summary is provided to facilitate an understanding of some of the innovative features unique to the present invention and is not intended to be a full description. A full appreciation of the various aspects of the invention can be gained by taking the entire specification, claims, drawings, and abstract as a whole.

It is therefore the purpose of the invention to alleviate at least to some extent one or more of the aforementioned problems of the prior art and/or to provide the relevant public with a suitable alternative thereto having relative advantages.

The primary object of the invention is related to the provision of an improved mobile application, computer program addon to web conferencing or virtual conferencing and addon to instant messaging platforms using method of conducting a mental confrontation aiming at increasing the quality, speed and simplicity of carried out disputes, debates, and discussions, taking place on the Internet, thus decreasing amount of low-quality mental confrontations carried out online.

It is further the objective of the invention to provide a method, apparatus, and computer instructions for providing a platform which provides logical and semantic aspects of communication, tools for visualizing polemics, recording correct results of the confrontation, and determination of winners by selected third-party authority (e.g., a judge, an adjudicator).

It is also the objective of system to provide a method whereby it increases in the level of organization, structure and quality of disputes, debates and discussions taking place on the Internet by adapting the agonal communication process.

It is also the objective of the invention to provide a platform in the form of mobile application, computer software, a website, and addons to virtual conferencing tools and instant messaging platforms, specialized for organizing and conducting disputes, debates, and discussions based on a video format for presenting the information.

It is further the objective of the invention to provide a level of interaction and quick access to users allowing to share the generated output in offline and online environments.

It is moreover the objective of the invention to provide: 1) a mobile application which is compatible for all types of Android and iOS systems; 2) a computer program which is compatible for major operating systems (e.g., Windows, MacOS, Unix); 3) a website which is compatible with major internet browsers (e.g., Google Chrome, Firefox, Safari, Opera, Microsoft Edge); 4) an addon to instant messaging platforms which is compatible with major messaging systems (e.g., Facebook Messenger, WhatsApp, Telegram, Viber, Google Hangouts, Slack, Asana); 5) an addon to that is compatible with most popular web conferencing or virtual conferencing tools (e.g., Zoom, Microsoft Teams, Google Meet, Cisco WebEx, Skype for Business).

It is further the objective of the invention to provide a system which is easy to use, easy to implement and provides an advance methodology of facilitation of disputes, debates and discussions.

This Summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

DETAILED DESCRIPTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

The main problems of confrontations (e.g., disputes, debates, and discussions) held on social networks, instant messaging platforms, and online conferencing platforms comes down to the following: 1) there are no basic rules for formalized communication; 2) personal insults are widely used; 3) there is no emphasis on the search and proof of truth as the ultimate goal of the mental confrontation; 4) participants often use irrelevant information, quasi-argumentation, that has little to do with the topic of discussion; 5) there is no authority (e.g., judge) chosen by parties; 6) there is no possibility to determine the winner correctly.

Confrontation (e.g., debates, disputes and discussions) organized in offline spaces and streamed online through a video feed, where opponents present in real-time cannot prevent interruptions from opposing sides and struggle to keep the airtime devoted to each party within time limits. In most cases, the number of opponents capable of participating in such disputes, debates or disputes at the same time is limited. Moreover, this type of confrontation requires significant infrastructure to organize and execute them out.

Online disputes and debates in social networks, instant messaging and online conference platforms in most cases, end in vain due to the lack of a visible structure, clear boundaries and a mechanism. A mechanism, that includes: a) clear boundaries and limits, b) a mechanism for their implementation, c) a procedure to appoint a third party (e.g., the judge), capable of solving confrontation, d) criteria to appoint the winner, e) restrictions that focus users' attention on the quality of argumentation, and f) limit their ability to break the rules. We are talking, in particular, about blocking the possibility of interrupting each other or exceeding the devoted time for argumentation.

Mental confrontations (debates, disputes and discussions) hosted offline and streamed online via a video stream require serious infrastructure for each dispute or debate, are expensive to scale, and do not automatically apply the rules of debate or dispute.

The suggested method allows users to organize confrontations (online disputes, debates and discussions) through a mobile application, computer software, a website and addons to different systems with pre-approved rules of agonal communication. Also, it offers the procedure to personally or randomly invite one or multiple opponents to the confrontation, record each argument or group of arguments into separate time-limited video clips.

This procedure creates a sequence of videos from all the opposing parties with comprehensive argumentation on the subject.

Finally, it allows the parties to personally or randomly select the judge or the group of judges who will resolve confrontation (dispute, debate or discussion) and appoint the winner. Judges can either evaluate each video with the arguments and mark them with points, thus letting the party with the biggest cumulative argumentation score win or select winner at once, based on general strength of the party's position and common sense.

The proposed method of mental confrontation is a formalized communication aimed at finding and establishing the truth. The process is initiated once the author begins the confrontation by recording an introductory (initial) video (1). Then, he records an argument supporting his position, if it hasn't been already made in the introductory video (2), invites opponent (3), opponent decides whether to participate in the confrontation (4), if opponent chooses to refuse, author is informed of such decision by notification and has the right to invite another opponent. Else, the opponent decided to proceed, and he records his first video with arguments supporting his position (5).

Then, the author records the following video with the counter-argument to the opponent's position or new argument supporting his position or finishes the active phase of confrontation (6).

If the author decides to finish active phase of a confrontation, step (8) is initiated, a judge is invited to the confrontation either randomly or individually. If the author records his counter-argument to the opponent's position or a new argument supporting his position, step (7) is activated. The opponent either records the following video with the counter-argument to the author's position or new argument favoring his position or finishes the active phase of the confrontation (7).

Suppose the opponent decides to finish the confrontation. In that case, step (8) begins, a judge is invited to the confrontation randomly or individually. If the opponent records his counter-argument to the author's position or a new argument supporting his position, in that case, the sequence of arguments continues until one of the parties finishes the active phase of the confrontation.

When author or opponent finishes the confrontation, a judge is invited (8). If the selected judge declines to participate in the confrontation, a new judge is invited. Consequently, judges are invited to the confrontation until one of them agrees to participate.

When judge is selected and agreed to participate, he evaluates all parties' video records with arguments (9), and the winner of the confrontation is selected (10). Then, the judge either records a video with the final verdict, thus explaining his decision, or leaves the decision without a video explanation. In both cases, confrontation is considered finished.

Groups of users can participate in confrontations without modifications to the described procedure above. The role of an author and the role of an opponent can be filled either with a single user or by the group of users with the same rights and limits as single users. For example, suppose the author of the confrontation is a single user, and the opponent is a group of users. The author recorded a video with his arguments (2). In that case, the group of users will have the right to record only one video clip (5), as if the single user would post it, even though multiple participants are opposing the author. Therefore, if the author's or opponent's role is filled either by the group or a single user, the procedure remains the same and fulfills its objective.

While a specific embodiment has been shown and described, many variations are possible. With time, additional features may be employed. The particular shape or configuration of the platform or the interior configuration may be changed to suit the system or equipment with which it is used.

Having described the invention in detail, those skilled in the art will appreciate that modifications may be made to the invention without departing from its spirit. Therefore, it is not intended that the scope of the invention be limited to the specific embodiment illustrated and described. Rather, it is intended that the scope of this invention be determined by the appended claims and their equivalents.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

I claim:

1. A system for conducting a mental confrontation in a form of a mobile application addons or instant messaging or online conferencing platforms suitable for individual or groups comprising an author of the mental confrontation, records an initial video, which mandatory contains at least one topic of confrontation; the initial video can also optionally include:
    a) the author's position on at least one topic;
    b) at least one argument supporting the author's position on the at least one topic; and
    c) at least one personal message to an opponent, encouraging the opponent to join the confrontation, wherein the author is initiator;
wherein the author of the mental confrontation records a second video, wherein the second video comprises:
    a) the author's position, if it was not addressed in the initial video;
    b) supporting argument of the author's position, at least one argument for each video, group of arguments per video, or all arguments in one video; if the author's position and the supporting arguments were not addressed in the initial video;
wherein the author invites at least one potential opponent to participate in the mental confrontation and/or suggests that any willing application users join the mental confrontation as the opponent;
opponent accepts or declines the invitation;
wherein the opponent records a first video comprising upon accepting the invitation:
    a) opponent's position in the mental confrontation, in case it is not apparent;
    b) at least one argument, supporting opponent's position, at least one argument for each video; or all arguments in one video;
    c) at least one contra argument or comments on the author's initial or second video;
wherein the author either records a following video with at least one counter-argument to the opponent's position, or a new argument in favor of his mental confrontation position or finishes the active phase of the mental confrontation;
wherein the opponent, either records a next video criticizing the author's position or a new argument in favor of opponent's position, or ends the mental confrontation, or the opponent ends the mental confrontation providing the author a right to record a last counter-argument;
wherein, after either party finishes the mental confrontation, at least one judge or group of judges are invited either randomly by mobile application or individually by the author; wherein the judge or the group of judges evaluate all records of parties using point based method of evaluation (i) or simplified method of evaluation (j) to determine a winner of the mental confrontation,
wherein the mental confrontation is performed using a mobile application module, and wherein the system creates a sequence of videos from all opposing parties, using the mobile application module, and wherein the mental confrontation is organized through the mobile application module, or a computer software, or a website and addons to different system with a pre-approved rule of agonal communication.

2. The system for conducting a mental confrontation of claim 1, wherein a point-based evaluation process is utilized as the main evaluation method, where each video clip with the argumentation is marked by the judge or the group of judges with at least one point, as a result, the party that has maximum points for their argumentation wins the confrontation else, if parties have equal points, a draw is declared.

3. The system for conducting a mental confrontation of claim 1, wherein the simplified evaluation process is utilized as secondary evaluation method, where the judge or group of judges selects a winning party based on presented arguments, strength of position and common sense.

4. The system for conducting a mental confrontation of claim 1, wherein the judge confirms the determined winner, and wherein after finishing the evaluation of the mental confrontation, the judge records at least one video with a final verdict, explaining his decision.

* * * * *